Feb. 8, 1938. E. E. COOPER 2,107,727
FAUCET
Filed April 26, 1934
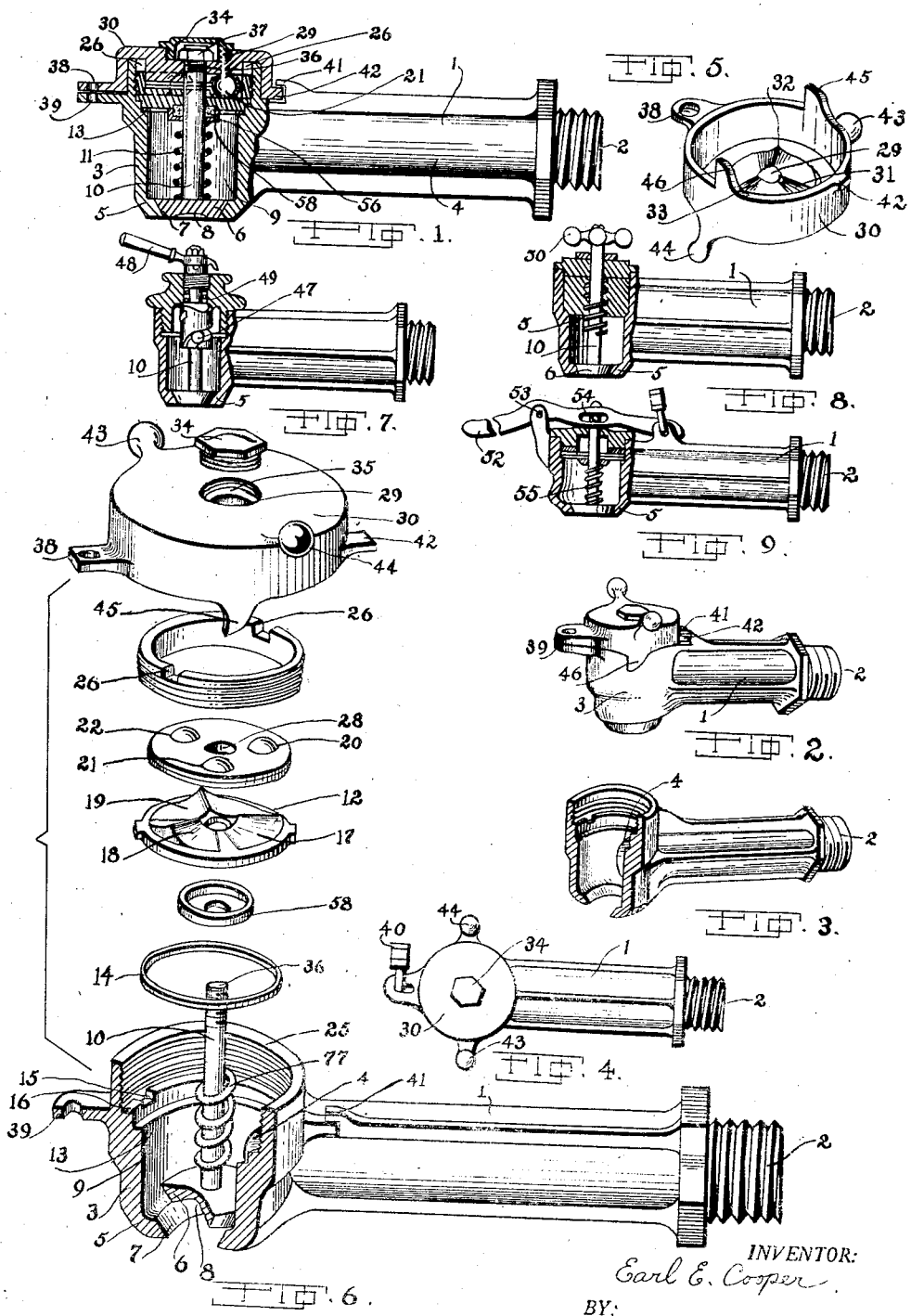
INVENTOR:
Earl E. Cooper
BY:
A. B. McCall
ATTORNEYS.

Patented Feb. 8, 1938

2,107,727

UNITED STATES PATENT OFFICE 2,107,727

FAUCET

Earl E. Cooper, Decatur, Ill., assignor to Chambers, Bering, Quinlan Company, Decatur, Ill., a corporation Application April 26, 1934, Serial No. 722,460

1 Claim. (Cl. 251—132)

My invention relates to faucets for releasing fluids from containers; and has for an object to provide an economical and practical improvement in faucets which will permit a release of fluids in a manner which will not cause the fluid to drip for a time after the faucet has been shut off.

An object of my invention is to provide a faucet having its releasing valve seat and valve head at the very lower extremity flush with the outlet portion of the faucet without having any tubular portion of the faucet extending down below the release valve as is so common in faucets existing on the market; since such a tubular portion below the valve unfortunately furnishes an inner wall for the fluids to cling to temporarily and drip from after the valve is shut off.

A particular purpose of my invention is to provide in a faucet for the release of oil from oil barrels an improvement in the oil release valve and seat whereby the lower extremity of the outlet part of the faucet casing is shaped to define a valve seat preferably tapered downwardly and toward the center or cone-shaped and flush with said lower extremity and to provide in conjunction therewith an oil release valvehead the end of which is cupped or upwardly concave while the perimeter thereof is cone-shaped to fit the valve seat.

I am aware of the fact that while the release valve feature of my faucet is one of the outstanding salient features thereof and certain mechanical features are provided for the manipulation of this valve, yet other mechanical methods of controlling my release valve improvement are possible and may be easily operative in conjunction with my release valve improvement within the scope of my invention as is shown in some of the figures of my drawing.

I attain the objects of my invention in the device described in the annexed specification, recited in the claim and illustrated in the accompanying drawing in which like reference numerals indicate like parts in the several figures.

Referring to the figures:

Figure 1 is a side view of my faucet showing the operating feature thereof in vertical half-section.

Figure 2 is a perspective of my faucet.

Figure 3 is a perspective of the casing portion of my faucet showing in a cut-away the interior structure of the fluid releasing section of the casing.

Figure 4 is a top view of my faucet.

Figure 5 is a perspective of the cap handle member shown up side down to disclose its interior construction.

Figure 6 is a perspective of the faucet casing as shown in Figure 3 together with vertical aligned details of the operating members of the faucet so as to indicate the relative operating position of the respective parts.

Figure 7 is a side view of a faucet showing, in section, a spiral lift method of lifting the valve.

Figure 8 is a side view showing, in section, a screw method of lifting the valve member.

Figure 9 is a side view of a faucet illustrating in a section a pivoted lever lift for the valve member.

Referring now in detail to the salient features of construction of my invention and the preferred manner of operating the same, I provide as the outstanding characteristics of my novel improvements in faucets, a means of releasing fluids from a container through a faucet so that when the faucet is shut off there will not be a tendency for the fluid to drain afterward and continue to drip from the mouth of the faucet.

In fact a highly important feature of my faucet improvement is to be found in the effective release of fluids such as oil and the like from the faucet in a manner which abruptly cuts off the column of fluid leaving only a single bubble formed by a built up pressure below the valve head and seat and this bubble promptly bursts, and the one drop formed thereby, falls into the receptacle along with the cut off fluid; thus leaving not the slightest bit of fluid draining from the faucet.

I achieve the purpose of my invention in a faucet which may be modified in a number of ways in so far as the manipulation thereof is mechanically controlled, and, for the sake of explanation of the novel features of my invention I am illustrating in the drawing and shall here describe several of the possible mechanical ways of operating it and shall point out one faucet structure in detail as a preferred operating arrangement.

It has heretofore been the common practice in the making of faucets to place the fluid release valve within the housing or faucet casing in such a position as will require the fluids to strike the inner walls of a discharge tube before the fluid leaves the faucet after it passes through the release valve; and when this construction is used the fluid striking the inner walls of the mouth of the faucet would have to drain therefrom after the valve has shut the fluid supply off; thus requiring time for the draining.

I provide in my invention a construction in faucets constituting a novel improvement wherein the fluid release valve is flush with the very end of the outlet portion of the valve casing where the casing is in fact shaped to define a valve seat which constitutes the mouth of the faucet at the very extremity of the casing with no discharge tube portion below it.

By observing the drawing it will be noticed that the faucet, whose features I shall point out in detail, has a casing 1 provided with a fluid receiving end 2 and fluid discharge portion 3 with which receiving end 2 is communicatively connected through tubular portion 4.

The mouth 5 of faucet 1 is shaped at its extremity to define a valve seat having a fluid release valve without any part of a tube portion extending below it, making the seat flush with the end.

For the sake of explaining the merits of my invention I shall describe its operation in connection with its use as an oil faucet for releasing oil from oil barrels and other containers; and in this connection it may be said that my invention is decidedly efficient for accomplishing the purposes above expressed.

In conjunction with valve seat 5 flush with the faucet mouth I provide a valve head 6 operatively seating upon the valve seat facing 7 and provided with concave or cupped recess 8 in the lower end of valve head 6.

With this arrangement and with mechanical means for manipulating valve head 6 by lifting it off of seat 5 when releasing oil through casing 1, I thus permit the escaping oil to run out of the casing between the lifted valve head and the valve seat facing 7 forming a stream of oil the beginning of which is of a hollow cone-shape and formed with an air space at the end of the valve head.

The oil, when released, will thus run smoothly, striking no inner wall surfaces after it leaves the valve in the faucet. Thus when the valve is closed, the stream of oil is suddenly cut off and a bubble of oil quickly forms in suspension beneath the concave part of the bottom of the valve head caused by the built up pressure created by this stream of oil moving past the concave portion of the valve head. However, this bubble of oil quickly forms and is quickly bursted by the pressure thus created and forms the single drop of oil which drops promptly from the faucet. Upon the bursting of the bubble the one drop immediately follows the cut off end of the oil stream into the receptacle therefor leaving not the slightest quantity of oil to drain thereafter from the faucet.

Although valve head 6 can be lifted in a number of ways, yet I have provided in this instance, as a preferable combination, an organization of parts which function efficiently.

In this instance, casing 1 is formed so that the oil discharge chamber 9 having a cylindrical wall is disposed at an angle which in this case is at right angles with the tubular intake portion 4. Valve stem 10 is encompassed by a coil spring 11, which at the bottom end presses against valve head 6 and at the top presses against a cap 59 at the bottom of the ball bearing cam plate 12.

A shoulder 13 of casing 1 receives a gasket 14 to prevent the escape of oil while a pair of notches 15 in a second shoulder 16 are adapted to hold ball bearing cam plate 12 from turning as it rests down against gasket 14.

Cam plate 12 is provided with integral cams 17, 18, and 19, spaced to receive balls 20, 21, and 22 between them. These balls are supported in the plate 23, while a threaded sleeve 24 is screwed down into threads 25 of casing 1 by a suitable wrench engaging notches 26 of sleeve 24.

Valve stem 10 (see Fig. 6) extends through central hole 27 of ball bearing cam plate 12, through central hole 28 of the ball bearing plate 23 and through central hole 29 of cap handle 30 which has on its inner side integral ball bearing cam members 31, 32, and 33 which rest upon balls 20, 21, and 22 and cooperate with cams 17, 18, and 19 for limiting the oscillating adjustments in cap 30 and holding valve head 6 firmly in closed position by automatically permitting spring member 11 to force the balls back to the bottom point in the ball track of cam plate 12 each time that the valve is released after opening the valve; thus permitting the valve stem to be forced down with head 6 from the position to which it has been lifted by turning cap handle 30 to the right or left when opening the valve.

A cap 34 is adapted to be screwed into threaded hole 35 of cap handle 30 to cover and protect the top threaded end 36 of valve stem 10 and nut 37 adapted to engage the threaded end 36 of valve stem 10.

Thus when stem 10 with valve head 6 is resiliently forced down normally by spring 11 the valve is closed and spring 11 has its top anchorage against fixed ball-bearing plate 12 while the resilient action of spring 11 also pulls down upon cap handle 30 and ball plate 23 with balls 20, 21, and 22 which are all resiliently held down in this action by nut 37.

It will be observed that perforated lug 38 of cap handle 30 cooperates with perforated lug 39 of casing 1 to provide means for engaging a padlock 40; while a fixed stop member 41 of casing 1 shaped to define a catch for engaging lug 42 of cap handle 30 is adapted to prevent cap handle 30 from being lifted after lug 42 is moved into registry under catch 41 and a padlock applied to perforated lugs 38 and 39.

It will therefor be observed that in order to open valve 6 by lifting it up off of annular facing 7 of valve seat 5 the cap handle 30 must be rotated to the left or right to release it from catch 41 and in so doing the movement of the contacting cams upon balls 20, 21, and 22 lifts the cap handle 30 and valve 6 against the compression of spring 11 whether moved to right or left and forces the cap handle and valve down again promptly upon the release of hand grips 43 and 44.

A pair of downwardly extending ears 45 and 46 of cap handle 30 are adapted to prevent the same from being moved too far to the right or left since either of them would strike perforated lug 39 before being moved too far around.

I have shown in Figures 7, 8, and 9 other mechanical methods of lifting valve head 6 from valve seat 5 any one of which would be successfully operative and wholly within the scope of my invention illustrated in connection therewith.

Referring to Fig. 7, the handle 48 operates a springless valve having a spiral guide 47 for a valve stem 10, and a packing 60 is held under a bushing or sleeve 61 having threads 49 and to which handle 48 is attached, while casing 62 operatively supports cap 63 which threads into it.

Handle 50 (see Fig. 8) operates valve stem 10 through the action of threads 51 on the stem.

It will be noted that packing 57 in the lower recess 56 is held in place by a cap 59 with spring

11 pressing up against the bottom surface 58 of the cap.

In Figure 9 I have shown a lever lift for valve 6 and valve stem 10 in which case a pressure on lever handle 52 which is pivoted at point 53 and slidably attached to valve stem 10 by pin 54 would tend to lift valve 6 off of valve seat 5. The valve would then be closed automatically by a compression spring 55 pressing down upon the top of valve stem 10.

I have thus illustrated and described a preferred mechanical construction of my invention together with certain mechanical constructions of manipulating means for the control of the valve which come within the general scope of my invention and have been shown and described to more completely point out the practical nature of my improvements in faucets.

Other mechanical methods of manipulating my novel features of improvement in faucets may be described and illustrated which would likewise fall within the scope of my invention.

Having thus described the nature of my invention what I claim is:

A faucet comprising a casing having means for attachment to a fluid container, and an intake opening, an outlet terminal at the lower extremity of the casing shaped at that point to define an annular valve seat from which to release fluids from the container through the faucet, a fluid release valve operatively mounted within said casing adapted to register with said valve seat, said casing having its receiving portion internally tubular and its discharge portion shaped to define a cylindrical chamber internally and disposed at an angle to said tubular intake portion; said valve having the head thereof shaped on the lower end to define a concave cup portion and having its outer peripheral facing shaped to fit said valve seat, a valve stem for the valve, a coil spring on the stem, a gasket seat in the wall of said discharge portion and a gasket adapted to seat therein, a cam plate seat above said gasket seat and of larger diameter and provided with peripheral notches therein, a cam plate slidably engaging said valve stem over said spring and gasket and provided with peripheral lugs for registry within said peripheral notches, ball bearings operatively seated on said cam plate, a threaded sleeve for engaging threads at the top of said discharge portion of the casing of the faucet, and a cap handle comprising in integral combination a cam face adapted to co-operate with said ball bearings, a hood for the casing, a perforated extension lug for receiving a detachable lock, a pair of downwardly extending integral flange stop members for limiting the oscillatable movement of the cap handle, a stop member lug extending from the side of the cap and an opening provided in the top of the cap for receiving a nut for engaging the upper end of the valve stem, and a threaded cap for covering said opening; said casing having an integral stop bracket for receiving said stop member lug to prevent unwarranted lifting of the valve, and an integral perforated extension lug on said casing cooperating with said perforated lug of the cap handle to provide means for holding the cap handle in locked position when the valve is closed.

EARL E. COOPER.